United States Patent
Olsson et al.

(10) Patent No.: US 10,568,020 B2
(45) Date of Patent: Feb. 18, 2020

(54) SYSTEMS AND METHODS FOR HANDLING NON-ACCESS STRATUM (NAS) INCOMPATIBILITY AND SCOPE OF AN ASSIGNED DCN

(71) Applicant: Telefonaktiebolaget LM Ericsson (publ), Stockholm (SE)

(72) Inventors: Lars-Bertil Olsson, Angered (SE); Peter Ramle, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/767,718

(22) PCT Filed: Nov. 9, 2015

(86) PCT No.: PCT/EP2015/076100
§ 371 (c)(1),
(2) Date: Apr. 12, 2018

(87) PCT Pub. No.: WO2017/063721
PCT Pub. Date: Apr. 20, 2017

(65) Prior Publication Data
US 2018/0295570 A1    Oct. 11, 2018

Related U.S. Application Data

(60) Provisional application No. 62/241,440, filed on Oct. 14, 2015.

(51) Int. Cl.
*H04W 36/00* (2009.01)
*H04W 48/16* (2009.01)
(Continued)

(52) U.S. Cl.
CPC ............ *H04W 48/16* (2013.01); *H04W 8/04* (2013.01); *H04W 8/082* (2013.01);
(Continued)

(58) Field of Classification Search
CPC ....... H04W 8/04; H04W 36/00; H04W 36/14; H04W 48/10; H04W 48/18; H04W 48/16; H04W 8/082; H04W 88/16
See application file for complete search history.

(56) References Cited

U.S. PATENT DOCUMENTS

2003/0028644 A1* 2/2003 Maguire ............... H04W 28/08
709/226
2013/0051315 A1* 2/2013 Arzelier ................. H04W 8/06
370/328
(Continued)

FOREIGN PATENT DOCUMENTS

WO    WO 2014/139084 A1    9/2014

OTHER PUBLICATIONS

International Search Report and Written Opinion of the International Searching Authority, PCT/EP2015/076100, dated Jun. 16, 2016, 15 pages.
(Continued)

Primary Examiner — Chi Ho A Lee
(74) Attorney, Agent, or Firm — Sage Patent Group

(57) ABSTRACT

This disclosure is directed to a method performed by a wireless communication device, WCD. The method comprises: receiving a base station message transmitted by a base station; and determining whether the received base station message includes information indicating that Non Access Stratum, NAS, type requests are supported by the base station, and also to a method in a base station communicating with a wireless communication device, WCD, residing in a cell served by the base station, the method comprising: generating, by the base station, a message comprising system information; transmitting, by the base station, the message comprising the system information, wherein the system information comprises information indi-
(Continued)

cating that Non Access Stratum, NAS, type requests are supported by the base station.

10 Claims, 15 Drawing Sheets

(51) Int. Cl.
| | |
|---|---|
| *H04W 48/12* | (2009.01) |
| *H04W 76/27* | (2018.01) |
| *H04W 8/04* | (2009.01) |
| *H04W 8/08* | (2009.01) |
| *H04W 36/14* | (2009.01) |
| *H04W 48/10* | (2009.01) |
| *H04W 48/18* | (2009.01) |
| *H04W 88/16* | (2009.01) |
| *H04W 76/14* | (2018.01) |

(52) U.S. Cl.
CPC ....... *H04W 36/0022* (2013.01); *H04W 36/14* (2013.01); *H04W 48/10* (2013.01); *H04W 48/12* (2013.01); *H04W 48/18* (2013.01); *H04W 76/27* (2018.02); *H04W 88/16* (2013.01); *H04W 76/14* (2018.02)

(56) References Cited

U.S. PATENT DOCUMENTS

| | | | |
|---|---|---|---|
| 2014/0241333 A1* | 8/2014 | Kim | H04W 48/16 370/338 |
| 2015/0049668 A1* | 2/2015 | Cho | H04W 48/18 370/328 |
| 2016/0050601 A1* | 2/2016 | Jeong | H04W 36/14 455/436 |
| 2016/0262068 A1* | 9/2016 | Won | H04W 36/0011 |
| 2017/0188280 A1* | 6/2017 | Watfa | H04W 36/0055 |
| 2017/0374613 A1* | 12/2017 | Ianev | H04W 76/18 |
| 2018/0199278 A1* | 7/2018 | Duan | H04W 48/18 |
| 2018/0220290 A1* | 8/2018 | Sivavakeesar | H04W 8/065 |

OTHER PUBLICATIONS

International Search Report and Written Opinion of the International Searching Authority, PCT/EP2016/074736, dated Dec. 13, 2016, 17 pages.

"Selection of CIoT DCN," (Ericsson) 3GPP Draft; V2.2, 3GPP Mobile Competence Centre, SA WG2 Meeting #111, Agenda Item 5.7, FS_AE_CIoT/Rel-13, Oct. 19-23, 2015, Chengdu, P.R. China (S2-153109) XP051034816, 5 pages.

"Solution for Enhanced Dedicated Core Network Selection," (Huawei et al.) 3GPP Draft, 3GPP Mobile Competence Centre, SA WG2 Meeting #111, Agenda Item 6.7, FS_eDecor/Rel-14, Oct. 19-23, 2015, Chengdu, P.R. China (S2-153307) XP051034961, 8 pages.

* cited by examiner

SYSTEMS AND METHODS FOR HANDLING NON-ACCESS STRATUM (NAS) INCOMPATIBILITY AND SCOPE OF AN ASSIGNED DCN

CROSS REFERENCE TO RELATED APPLICATIONS

This application is a 35 U.S.C. § 371 national stage application of PCT International Application No. PCT/EP2015/076100 filed on Nov. 9, 2015, which in turns claims domestic priority to U.S. Provisional Patent Application No. 62/241,440, filed on Oct. 14, 2015, the disclosures and content of which are incorporated by reference herein in their entirety.

TECHNICAL FIELD

Aspects of this disclosure relate to handling Non-Access Stratum (NAS) incompatibility and scope of an assigned DCN.

BACKGROUND

3GPP networks are beginning to support devices and customers with very different characteristics, such as machine type devices, mobile virtual network operator (MVNO), data usage, etc. These classes of devices and customers may have different requirements from the Core Network (CN) in terms of optional feature support, traffic characteristic support, availability, congestion management, ratio of signaling to user plane traffic, etc. As we move forward the classes of devices/customers will continue to increase. One cost effective mechanism for operators to support these different classes of devices and customers is to create separate Dedicated Core Networks (DCNs) consisting of specialized core network elements that are designed and deployed to meet the requirements of these different devices and customers. It is cost-effective as the network availability or redundancy requirements may be easier to meet with different hardware and/or software than the existing core networks. Also, creating separate core networks enables independent scaling or specific feature provisioning for specific user or traffic types and isolating specific users and traffic from each other.

Typically, a Wireless Communication Device (WCD) communicates with a Core Network (CN)—e.g. one or more DCN—via a Radio Access Network (RAN). The CN—which may be a DCN—comprises a number of CN nodes. Examples of known CN nodes may be the Serving Gateway (SGW) and the Mobility Management Entity (MME) and the PDN Gateway (PGW) and the Policy and Charging Rules Function (PCRF) and the Home Subscriber Server (HSS) and the Serving GPRS Support Node (SGSN). However, this disclosure is not limited to a particular known CN or DCN comprising known CN nodes. On the contrary, the disclosure is also related to future CNs or DCNs comprising future CN nodes that are to be developed in the coming years. Indeed, the precise structure of a CN or DCN is not that important to the present disclosure. However, known CNs and known CN nodes and known Radio Access Networks are briefly discussed below to give some context to the present disclosure.

The Radio Access Network (RAN) covers a geographical area which is divided into cell areas, with each cell area being served by a base station, e.g. a Radio Base Station (RBS). In some radio access networks the base station is e.g. called "NodeB" or "B node" or enhanced NodeB (eNB). A cell is a geographical area where radio coverage is provided by the equipment of a radio base station at a base station site. Each cell is identified by an identity within the local radio area, which may be broadcasted in the cell. The base stations communicate via an air interface with radio terminals within range of the base stations.

In some versions of the RAN, several base stations are typically connected, e.g. by landlines or microwave links, to a Radio Network Controller (RNC) or a Base Station Controller (BSC) or similar. The radio network controller or similar supervises and coordinates various activities of the plural base stations connected thereto. The radio network controllers are typically connected to one or more core networks.

For example, the General Packet Radio Service (GPRS) is a wireless communication system, which evolved from the GSM. The GSM EDGE Radio Access Network (GERAN) is a radio access network for enabling radio terminals to communicate with one or more core networks.

For example, the Universal Mobile Telecommunications System (UMTS) is a third generation wireless communication system, which evolved from the Global System for Mobile Communications (GSM), and is intended to provide improved mobile communication services based on Wideband Code Division Multiple Access (WCDMA) access technology.

The wireless communication device (WCD) may e.g. be a mobile station (MS) or a user equipment (UE) or similar wireless device, e.g. such as mobile phones, or cellular phones, or laptops or tablet, phablet, machine type communication device or similar devices with wireless capability, and thus can be, for example, portable, pocket, hand-held, computer-comprised, or vehicle-mounted or other wireless devices which communicate voice and/or data with a radio access network. It should be emphasized that the WCD may be embedded (e.g. as a card or a circuit arrangement or similar) in and/or attached to various other devices, e.g. such as various laptop computers or tablets or similar or other mobile consumer electronics or similar, or vehicles or boats or air planes or other movable devices, e.g. intended for transport purposes. Indeed, the radio terminal may even be embedded in and/or attached to various stationary or semi-stationary devices, e.g. domestic appliances or similar, or consumer electronics such as printers or similar having a semi-stationary mobility character.

Typically the Core Network (CN), to which the WCD communicates via the RAN, comprises a number of core network nodes.

Examples of core network nodes are the Serving Gateway (SGW) and the Mobility Management Entity (MME) and the PDN Gateway (PGW) and the Policy and Charging Rules Function (PCRF) and the Home Subscriber Server (HSS) and the Serving GPRS Support Node (SGSN).

FIG. 1a shows a schematic overview of a well-known exemplifying wireless communication system. The system is a so called LTE based system. It should be pointed out that the terms "LTE" and "LTE based" system is here used to comprise both present and future LTE based systems, such as, for example, advanced LTE systems.

It should be appreciated that although FIG. 1a shows a wireless communication system in the form of a LTE based system, the example embodiments herein may also be utilized in connection with other wireless communication systems comprising nodes and functions that correspond to the nodes and functions of the system in FIG. 1.

In FIG. 1 the E-UTRAN corresponds to the RAN, which in this case comprises a number of radio access node in the form of eNodeBs (eNB) that interfaces with a WCD, which is denoted User Equipment (UE) in LTE. Several UEs are normally served by one eNB. However, for the sake of simplicity only one UE is illustrated in FIG. 1.

The Serving Gateway (SGW) routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The Mobility Management Entity (MME) is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs The PDN Gateway (PGW) is a network gateway node that provides connectivity for the UE to one or more external Packet Data Networks (PDNs) 250 by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1× and EvDO).

The Policy and Charging Rules Function (PCRF) determines policy rules in real-time with respect to the radio terminals of the system. This may e.g. include aggregating information in real-time to and from the core network and operational support systems etc of the system so as to support the creation of rules and/or automatically making policy decisions for user radio terminals currently active in the system based on such rules or similar. The PCRF provides the PGW with such rules and/or policies or similar to be used by the PGW acting as a Policy and Charging Enforcement Function (PCEF).

The Home Subscriber Server (HSS) is a database that contains user-related and subscriber-related information. It also provides support functions in mobility management, call and session setup, user authentication and access authorization.

The nodes and units of the wireless communication system in FIG. 1 are connected by lines extending between the nodes and units. Each such line is marked with a label, which corresponds to the name used in the 3GPP specifications for the particular interface. This is well known to those skilled in the art and it needs no further explanation.

It should be appreciated that although FIG. 1 shows a wireless communications system in the form of an exemplifying LTE based system, the example embodiments herein may also be utilized in connection with other wireless communication systems comprising nodes and functions that correspond to the nodes and functions of the system in FIG. 1.

SUMMARY

One way to determine which Dedicated Core Network (DCN) should be used to provide a service to a Wireless Communication Device (WCD) is for the WCD to provide to a base station that can serve the WCD information identifying a requested Non-Access Stratum (NAS) type (e.g., a NAS type identifier). For example, the WCD can include in a request message, such as a connection request (e.g., an RRC Connection Request) or other request, information identifying a requested NAS type.

The various NAS types that a WCD may request may be identified by information indicating the variant or version of the NAS protocol (or equivalent protocol), which is terminated by the WCD and a core network node (e.g., the Mobility Management Entity (MME) or the Serving GPRS Support Node (SGSN)) and which is used to support functionality such as authentication, admission control, mobility handling, and similar. The information indicating a requested NAS type may correspond to a protocol version indicator, a compatibility indicator, or other indicator which enables a RAN node to select a matching core node which is able to terminate the NAS signaling matching the requested NAS type.

However, a problem arises because, if the requested NAS type is not supported by the RAN (e.g. by the base station in question), then the request will fail which can lead to the WCD re-sending the request message to the RAN (e.g. base station). This, in turn, leads to an increase in RAN signaling load and potentially also signaling to a core network (CN).

Some of the drawback indicated above are mitigated or eliminated by an embodiment of the present solution directed to a method performed in a WCD, the method comprising:
  receiving, at the WCD, a base station message transmitted by a base station; and
  determining, by the WCD, whether the received base station message includes information indicating that NAS type requests are supported by the base station.

Some of the drawback indicated above are mitigated or eliminated by another embodiment of the present solution directed to a method performed in a WCD, the method comprising:
  transmitting, by the WCD, to a base station a request message comprising information identifying a requested NAS type;
  receiving, at the WCD, as a result of transmitting the request message, a response message transmitted by the base station, the response message indicating whether or not the requested NAS type is supported by the base station.

Some of the drawback indicated above are mitigated or eliminated by another embodiment of the present solution directed to a method performed in a base station communicating with a WCD residing in a cell served by the base station, the method comprising, the method comprising:

generating, by the base station, a message comprising system information;

transmitting, by the base station, the message comprising the system information, wherein the system information comprises information indicating that Non Access Stratum, NAS, type requests are supported by the base station.

Some drawbacks are also mitigated or eliminated by another embodiment of the present solution directed to a method performed in a WCD comprising at least one Dedicated core network Selection Assistance indication (DSA indication), indicating a Dedicated Core Network (DCN) and a DSA Origin indication indicating the origin of the DSA indication, the method comprising:

transmitting to the base station a connection message comprising the DSA indication indicating to the base station the DCN selected by the WCD and comprising the DSA origin indication indicating the origin of the DSA indication.

Some drawbacks are also mitigated or eliminated by another embodiment of the present solution directed to a method performed in a base station communicating with a WCD residing in a cell served by the base station, the method comprising:

receiving a complete message transmitted by the WCD and comprising a Dedicated core network Selection Assistance indication (DSA indication), indicating a DCN selected by the WCD and a DSA Origin indication indicating the origin of the DSA indication; and selecting, as a result of receiving the complete message, a DCN for serving the WCD, which selection is based on the DSA indication and the DSA origin indication comprised by the received complete message.

It is noted that the solution described herein, with reference to exemplifying embodiments, relates to all possible combinations of features recited in the claims. Further features of, and advantages with, the present solution will become apparent when studying the appended claims and the following description. Those skilled in the art realize that different features of the present solution can be combined to create embodiments other than those described in the following.

BRIEF DESCRIPTION OF THE DRAWINGS

The foregoing will be apparent from the following more particular description of the exemplifying embodiments, as illustrated in the accompanying drawings in which like reference characters refer to the same parts throughout the different views.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1A:
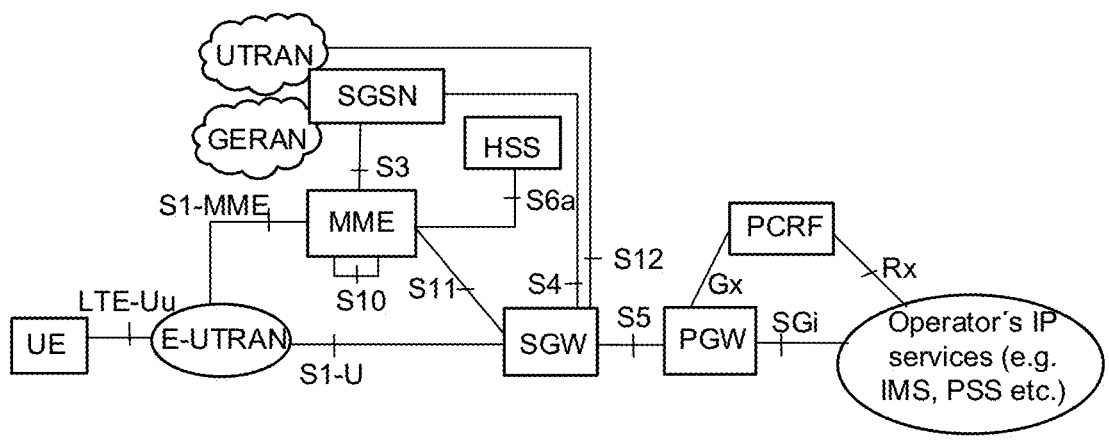
FIG. 1a illustrates a schematic overview of a well-known exemplifying wireless communication system
Figure 1B:
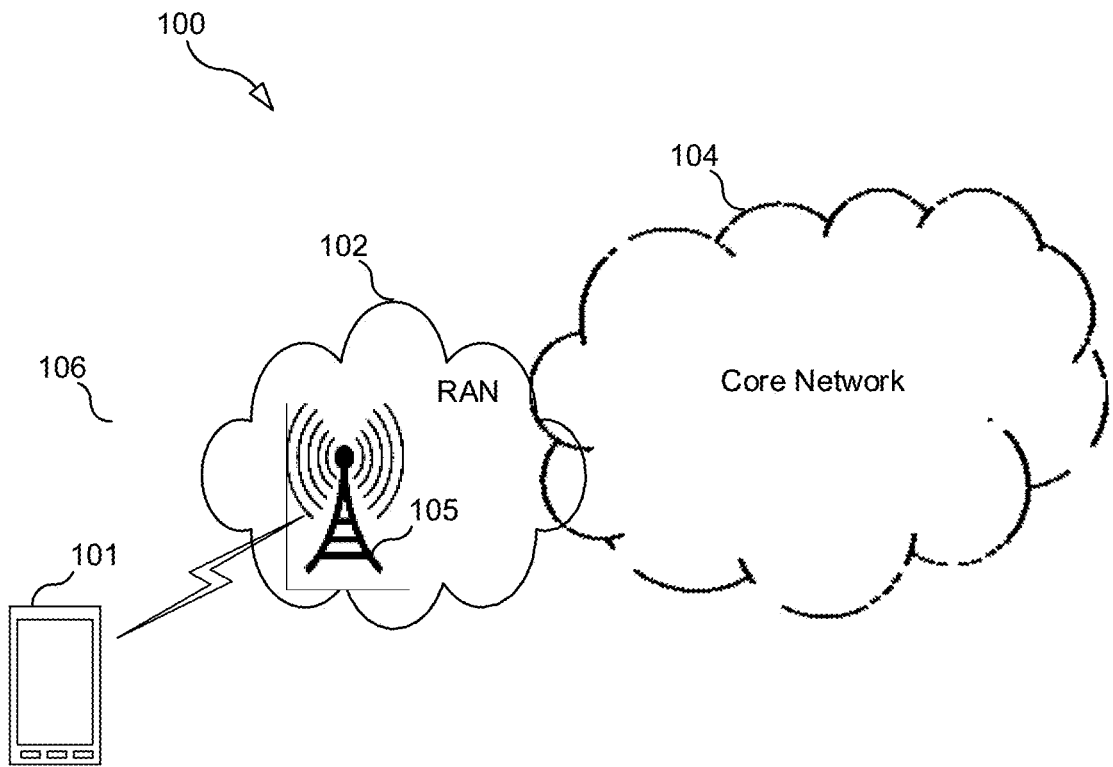
FIG. 1b illustrates a wireless communication system according to some embodiments.

FIG. 1b illustrates a wireless communication system 100 according to some embodiments. As shown in FIG. 1, system 100 includes a WCD 101 that is able to wirelessly communicate messages with a base station 105 (e.g., an evolved NodeB (eNodeB), a radio network controller (RNC), a base station system (BSS), or other base station) of radio access network (RAN) 102 (e.g., a UTRAN, EUTRAN, GERAN, etc.), e.g. a message comprising information indicating a requested Non Access Stratum (NAS) type. As shown, the base station 105 is connected (directly or indirectly) to one or more core networks (CNs) 104, e.g. such as the Evolved Packet Core (EPC) or similar. The base station 105 serves a cell 106 wherein the WCD 101 currently residing.

Figure 2:
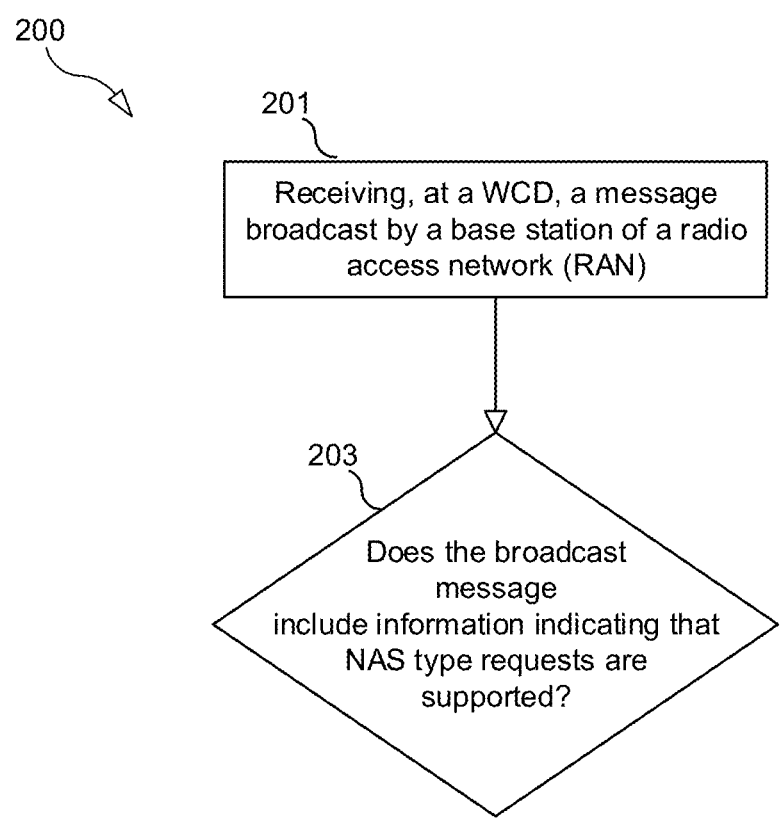
FIG. 2 is a flow chart illustrating a process according to some embodiments.

FIG. 2 is a flow chart illustrating a process 200 according to the present solution performed by the WCD 101. The process 200 may be used, for example, in an attempt by the WCD to use a particular one of several different predefined types of NAS protocols.

In step 201, in which WCD 101 receives a message 302 (see FIGS. 3, 4 and 5) transmitted by base station 105 of a RAN 102 (message 302 may be broadcasted by the base station). In some embodiments, message 302 may include one or more System Information Blocks (SIBs) that includes information indicating that NAS type requests are supported by the base station 105. While several of the figures illustrate RRC signaling (see e.g., FIGS. 3-5 and 8-10) related to UTRAN and E-UTRAN environments, this disclosure is not limited such that it doesn't applies to other RANs, such as GERAN, that do not use RRC signaling.

In step 203, the WCD determines whether the message 302 includes the information indicating that NAS type requests are supported. For example, this may be done by checking whether the received broadcast message includes information indicating that NAS type requests are supported. The information indicating that NAS type requests are supported may e.g. be a new indication "Supports NAS type requests" that informs the WCD that the BS 105 understands the concept of NAS types and will process a request for a specific NAS type if it's indicated in an RRC Connection Request message or similar.

Figure 3:
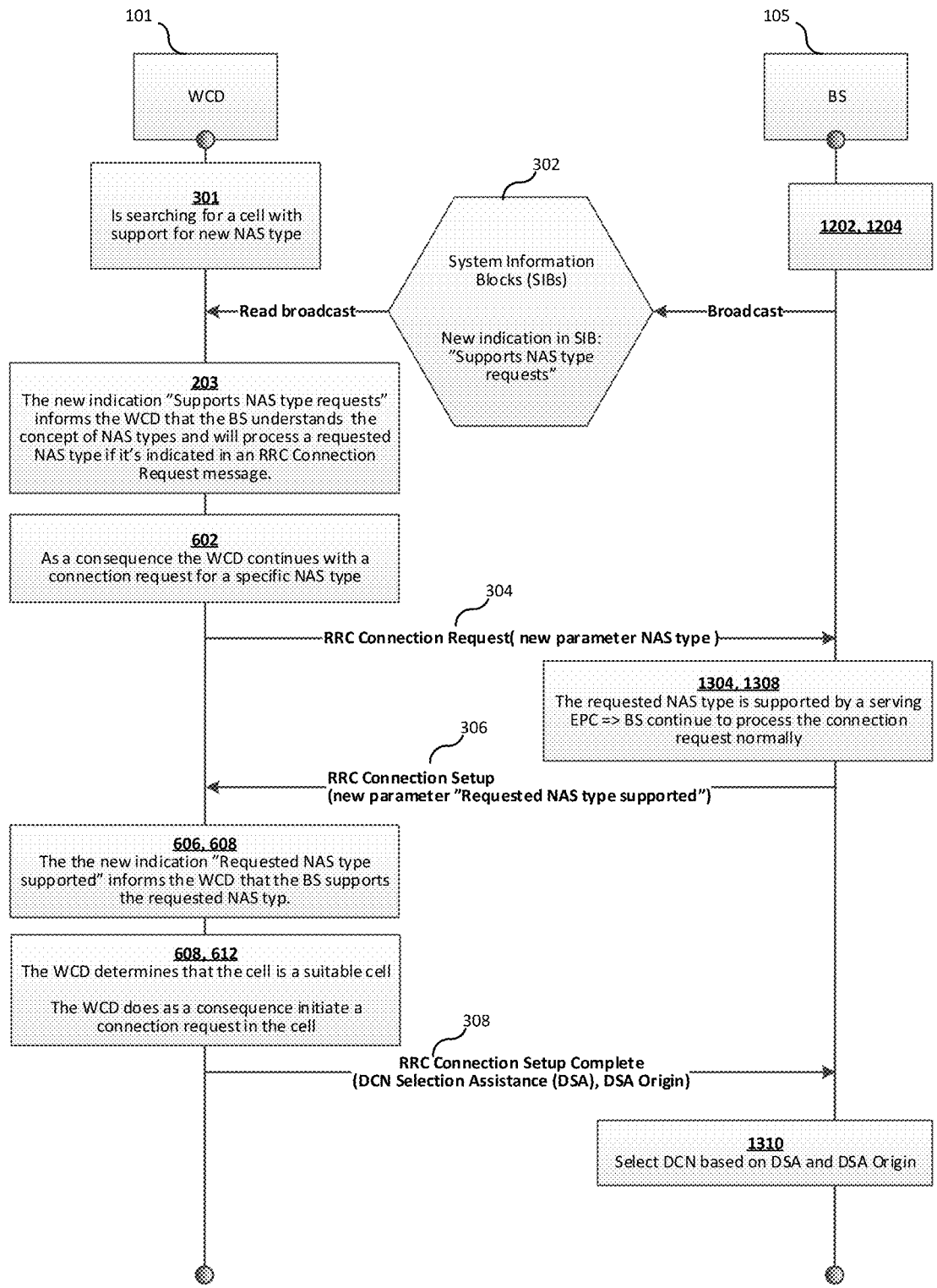
FIGS. 3, 4 and 5 are message flow diagrams illustrating a process according to some embodiments.
Figure 4:
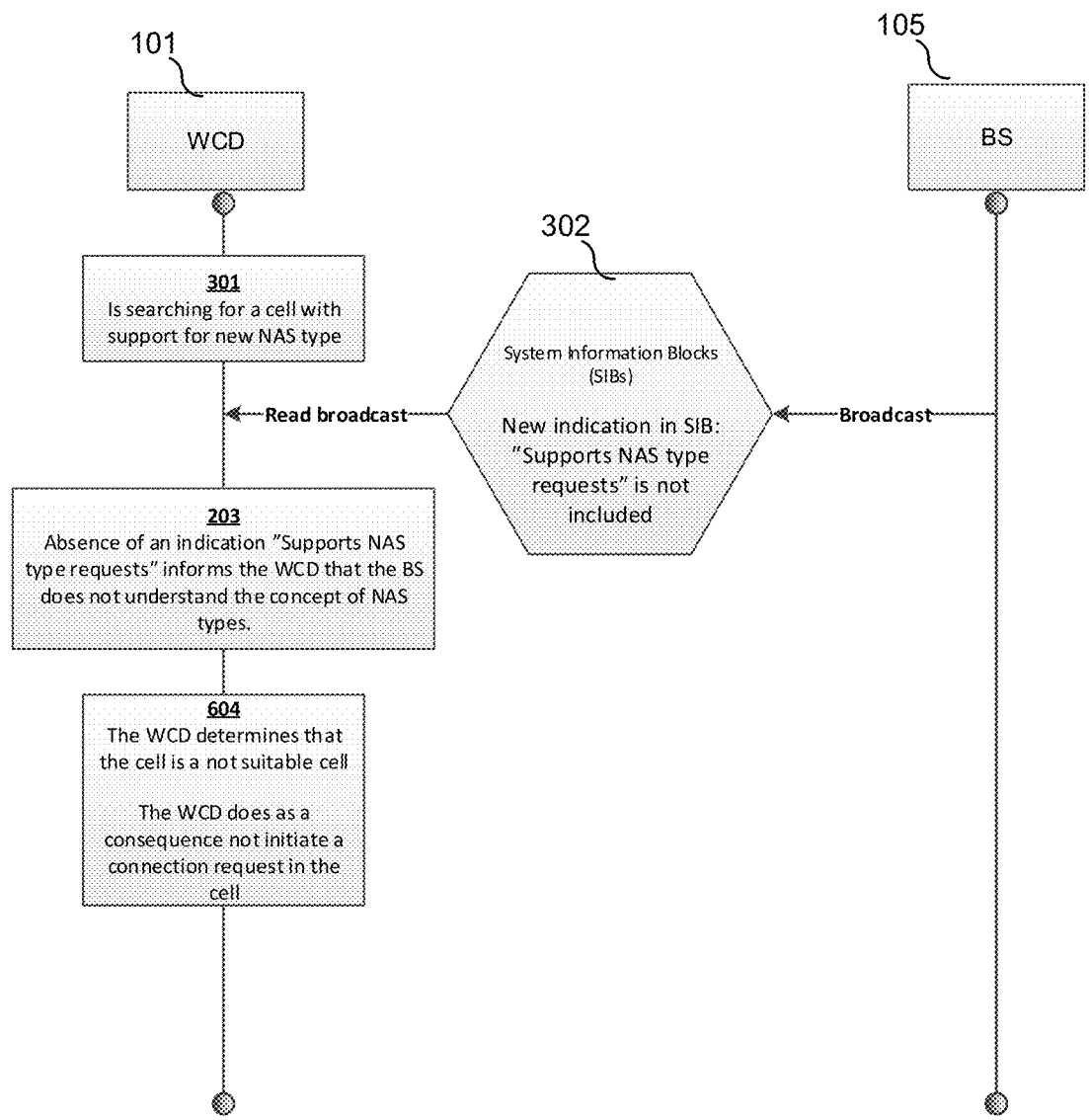
Figure 5:
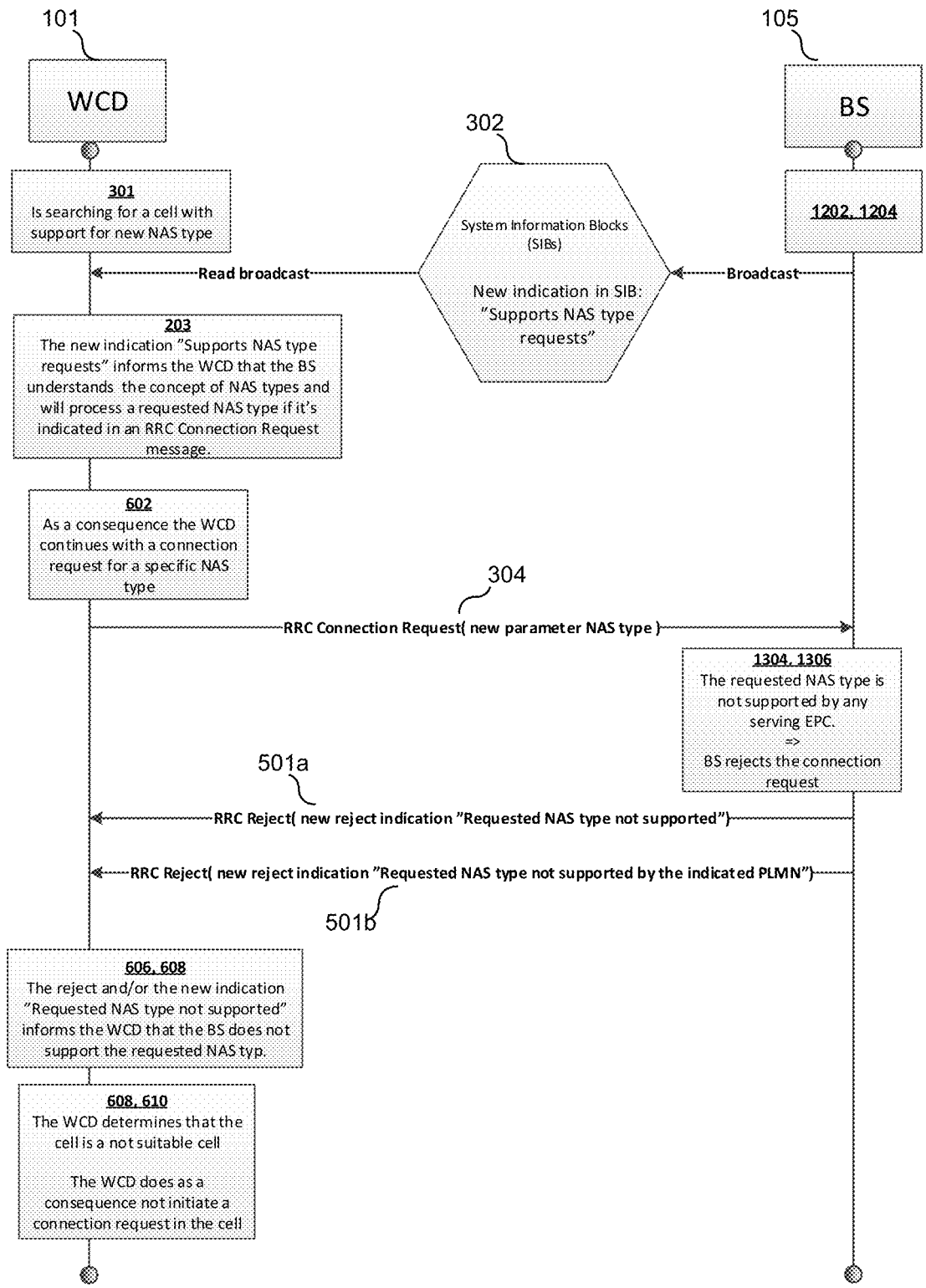

Steps 201 and 203 are further illustrated in the message flow diagrams shown in FIGS. 3-5, which show, among other things, that the WCD 101 may receive a broadcasted SIB, see message 302 in FIGS. 3, 4 and 5. Also FIGS. 3-5 show an optional step 301 in which the WCD 101 may search for a cell with support for NAS type requests. The searching step 301 may precede steps 201 and 203. The features of step 301 applies mutatis mutandis to FIGS. 8, 9 and 10.

Figure 6:
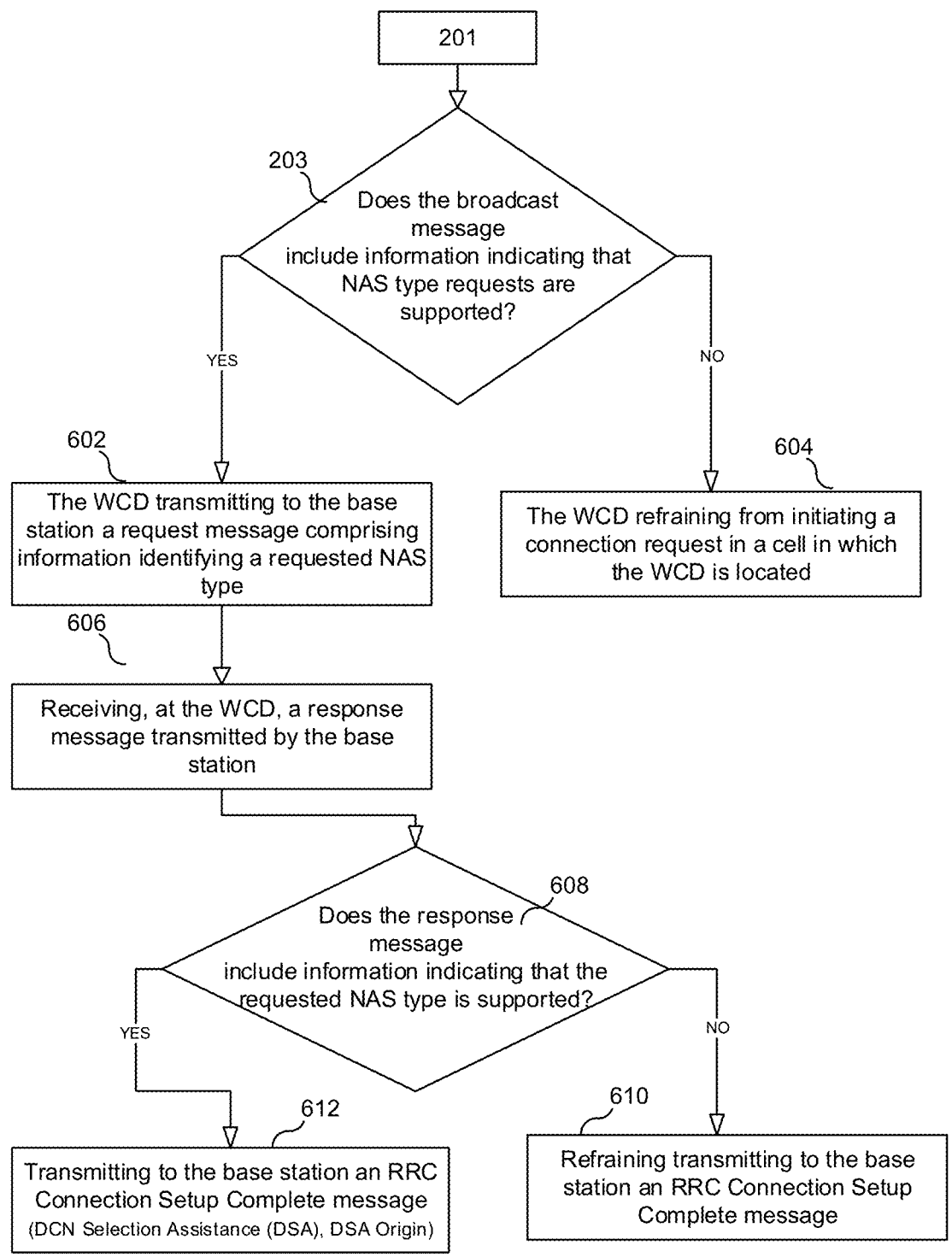
FIG. 6 is a flow chart illustrating a process according to some embodiments.

Referring now to FIG. 6, FIG. 6 is a flow chart that illustrates example steps that WCD 101 may take in response to the determination made in step 203 of FIG. 2.

In step 602, as a result of determining that the message 302 includes information indicating that NAS type requests are supported by the base station 105, the WCD 101 continues with a connection request for a specific NAS type, e.g. by transmitting to the base station a connection request message 304 (see FIGS. 3 and 5). The request message 304 comprises information identifying the requested NAS type (e.g., a NAS type identifier). The request message may e.g. be an RRC Connection Request in the UTRAN/E-UTRAN environments, as is shown in message flows shown in FIG. 3 and FIG. 5. In a GERAN environment, request message 304 may be the first RLC data block used to transfer an LLC PDU (i.e. including the mobility message on the NAS layer) once a temporary block flow (TBF) has been established. As a consequence of sending the connection request message 304 to the base station, the WCD 101 may receive a response message 306 or 501*a*, 501*b*, as will be further described below with reference to step 606.

In step 604, as a result of determining that the message 302 does not include information indicating that NAS type requests are supported by the base station 105 the WCD refrains from initiating a connection request in a cell in which the WCD is located, where the base station serves the cell (see FIG. 4). That is, for example, WCD 101 refrains from transmitting the request message 304, e.g. by not initiating a connection request.

In step 606, the WCD 101 receives a response message (e.g., message 306 or 501*a*, 501*b*—see FIGS. 3 and 5) transmitted by the base station 105 in response to the request message 304 that identifies a requested NAS type. The response message indicates whether or not the identified NAS type is supported by the base station 105. The actions performed by the base station is described later in more detail with reference to FIG. 13, see in particular steps 1304, 1306, 1308.

In step 608, the WCD 101 determines whether the response message (e.g. message 306 or 501*a*, 501*b*, e.g. an RRC Connection Setup message or other acknowledgment message, or an RRC Reject message respectively) includes information indicating that the requested NAS type is supported by the base station 105. If the response message includes information indicating that the requested NAS type is supported, then the process proceeds to step 612, otherwise the process proceeds to step 610. If the NAS type is supported by the base station it is preferred that this means or indicates that the NAS type is also supported by the CN 104 served by the base station.

In step 610, as a result of determining that the response message (e.g. message 501*a*, 501*b*) is a reject message and/or includes information indicating that the requested NAS type is not supported, the WCD refrains from transmitting to the base station a complete message 308 (e.g. an RRC Connection Setup Complete message). The steps taken by the base station at reject is descried in more detail below with reference to FIG. 13 and steps 1304, 1306.

In step 612, as a result of determining that the response message (e.g. message 306) includes information indicating that the requested NAS type is supported, the WCD may transmit to the base station another message, e.g. a complete message 308 (e.g., an RRC Connection Setup Complete message) in response to the response message. The complete message 308 may be or may include a NAS Attach request or other NAS message (e.g., such as Routing Area Update, Tracking Area Update, Service Request message etc.) In some embodiments, the WCD may include such NAS messages in the request message 304. The steps taken by the base station when it supports the requested NAS type descried in more detail below with reference to FIG. 13 and steps 1304, 1308.

Figure 7:
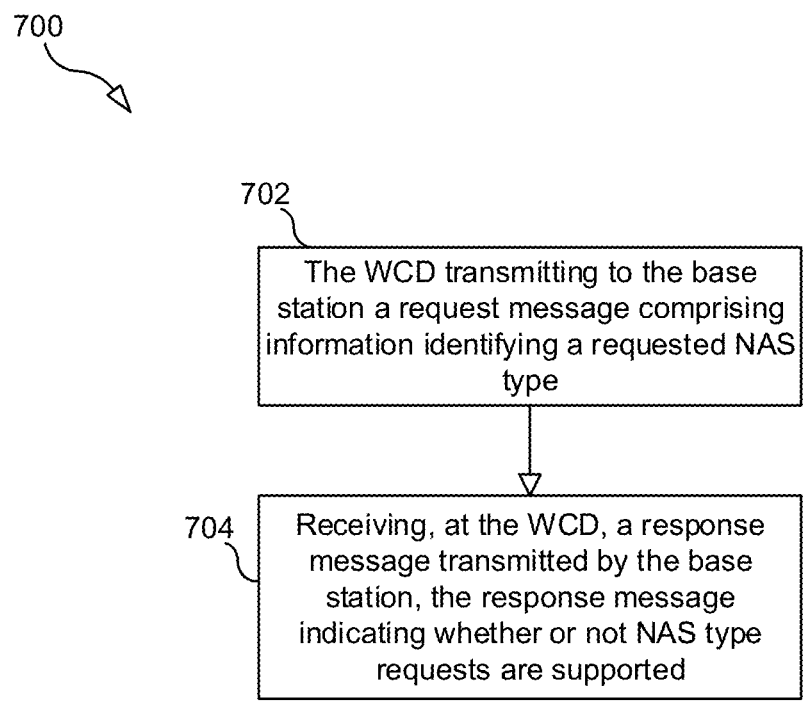
FIG. 7 is a flow chart illustrating a process according to some embodiments.

Before proceeding to FIG. 7 it should be added that it is preferred that the WCD 101 provides in the response message (e.g. message 308) a DCN Selection Assistance (DSA) indication indicating a selected DCN to the base station 105, i.a. a DCN selected by the WCD.

The DSA indication reduces the signaling required to register to and maintain a DCN. It also improves isolation between DCNs, since there is a reduced need for redirecting between different DCNs. Also, a selected DCN available at the WCD and indicated by the DSA indication sent by the WCD to the RAN (e.g. base station 105) makes it possible for simplified WCDs to be associated with a specific DCN.

It is preferred that the DSA indication is either based on one or more DSA indications that are locally configured in the WCD (e.g. one or more DSA indications pre-stored in the USIM or other storage arrangement in the WCD) or based on DSA indication(s) provided to the WCD by the network, e.g. such as the CN 104. The network providing the DSA indication(s) to the WCD may be a home CN related to a home Public Land Mobile Network (PLMN) of the WCD, or a visited CN related to a visited PLMN wherein the WCD currently resides that is different from the home PLMN, e.g. in case of a roaming scenario.

At the outset this enables the WCD 101 to provide a substantially static DSA indication to the base station, e.g. simply provide the DSA that has been most recently configured into the WCD. However, the WCD 101 may to some extent dynamically provide different DSA indications for indicating different DSAs to the base station. To do this the WCD may e.g. use the PLMN as key, e.g. the PLMN as indicated in a broadcast from the cell wherein the WCD is currently residing. Thus, the WCD may e.g. use PLMN as a key to determine the locally configured DSA indication or the network-provided DSA indication to be sent to the base station. This enables the WCD to provide a DSA indication that is more suitable for the current network conditions.

However, according to the above the WCD only provides a plain DSA indication without any indication of origin of the DSA indication. This causes problems in many situations. For example, the WCD may indeed use a broadcasted PLMN or some other key for determine the DSA indication to be sent to the base station, but in a way that is not expected by the base station. For example, the WCD may use the broadcasted PLMN as a key to select a locally configured DSA indication that was configured in the WCD to be suitable for the home CN and PLMN, but which is not suitable for the visited CN and visited PLMN wherein the WCD is currently residing. The base station may then select a DCN that is not suitable for the current network conditions. Moreover, the DSA indication provided by the WCD to the base station may itself be ambiguous. For example, there may be a first DSA indication indicating a DCN with a name or identifier that is associated with the home CN and the home PLMN, and a second DSA indication indicating a DCN with the same name or identifier that is associated with the visited CN and the visited PLMN. If the base station receives a DSA indication of that kind, the base station may not know whether the DCN indicated by the received DSA indication is associated with the visited CN and visited PLMN or with the home CN and home PLMN. The base station may then select a DCN that is not suitable for the current network conditions.

Thus, the absence of information that reveals the origin of the DSA indication provided by the WCD to the base station may cause the base station to make an incorrect interpretation and select an inappropriate DCN. An incorrectly selected DCN may require the CN to resolve the scenario by making use of redirection signaling or similar to end up in a correct DCN. However, doing that will create additional signaling and also remove a wanted characteristic, which is isolation of DCNs by not making use of any redirection.

Thus, in view of the above it is preferred that the WCD 101 provides in the complete message (e.g. message 308) both a DSA indication indicating a selected DCN to the base station 105, and a DSA Origin indication indicating the origin of the DSA indication.

The DSA Origin indication may e.g. indicate different classes of information, e.g. such as one or more of:

1) An indication of origin:
"is a default value", or
"is a network assigned value"
2) For default values an indication of:
"is associated with home PLMN", or
"is associated with the currently visited PLMN", or
"is associated with a generic visited PLMN".
3) For an origin from a visited PLMN an indication of:
the PLMN ID of the associated PLMN.

To achieve this result it is preferred that the WCD 101 behaves as follows:

a) The WCD identifies broadcast PLMN (=a PLMN in broadcast in the cell, for which the WCD intend to request service)

b) The WCD compares broadcast PLMN with PLMNs for which WCD has been provided with a network assigned value for DSA. At a match, the WCD indicates "is a network assigned value" together with the previously network assigned value for "selected DCN", as part of the WCD request (e.g. in message 308).

In this process the WCD may have access to a network assigned DCN Selection Assistance value. In that case the behavior may be as described. However, it may also be that the WCD is provided with a NAS Equivalent PLMNs list only and no network assigned DSA parameter except for the serving PLMN.

In that case the WCD may need to get a USIM-configured value Default DSA parameter, since the network assigned ditto is not available. To make the WCD provide a USIM-configured value is still an improvement compared to no indication at all.

However, to cater for this optional flow the logic is when the WCD enters PLMN search and as part of that process extracts a USIM-configured value for DCN Selection Assistance parameter.

c) At no match at step b the WCD compares broadcast PLMN with USIM-configured PLMNs or similar. At a match with a home PLMN the WCD indicates "is associated with home PLMN" together with a WCD-configured value "selected DCN" which is associated with the home network. Note that home PLMN may be configured in more than one way.

d) At no match at step c the WCD compares broadcast PLMN with USIM-configured PLMNs. At a match with an allowed roaming PLMN and when the WCD has a specific value "selected DCN" which is associated with the broadcast PLMN, the UE indicates "is associated with this visited PLMN" together with this UE-configured value "selected DCN".

e) At no match at step d the WCD compares broadcast PLMN with USIM-configured PLMNs. At a match with an allowed roaming PLMN and when the WCD has no specific value "selected DCN" which is associated with the broadcast PLMN, the WCD indicates "is associated with visited PLMN" together with a WCD-configured value "selected DCN" which is associated with all roaming networks.

The additional DSA Origin indication enables RAN (e.g. the base station 105) to make a better DCN selection, especially when DCN values are not standardized.

Some examples:

RAN may select separate common DCNs for home subscribers and roamers,
RAN may, based on roaming agreement, be able to interpret a foreign DCN value (a DCN value assigned by a different operator) also when there is an overlap in value space between the DCN values,
RAN may select separate DCNs based on individual roaming agreements per PLMN.

As a consequence the risk of that RAN selects an inappropriate DCN and from that would require redirection is if not eliminated so at least substantially reduced.

Referring now to FIG. 7, FIG. 7 is a flow chart illustrating another example process 700 performed by WCD 101. The process may be used, for example, in an attempt by WCD 101 to use a particular one of several different types of NAS protocols.

Figure 8:
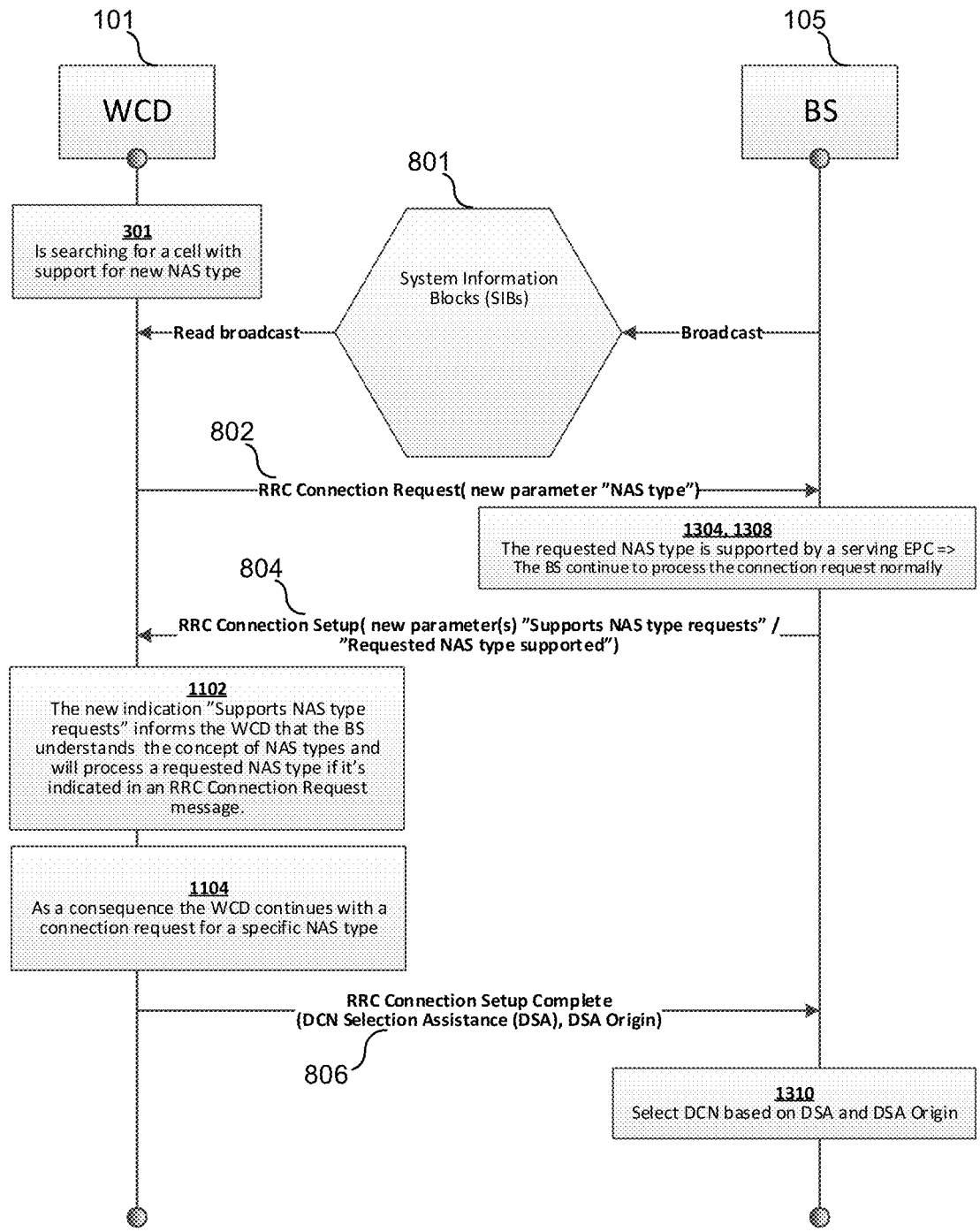
FIGS. 8, 9 and 10 are message flow diagrams illustrating a process according to some embodiments.
Figure 9:
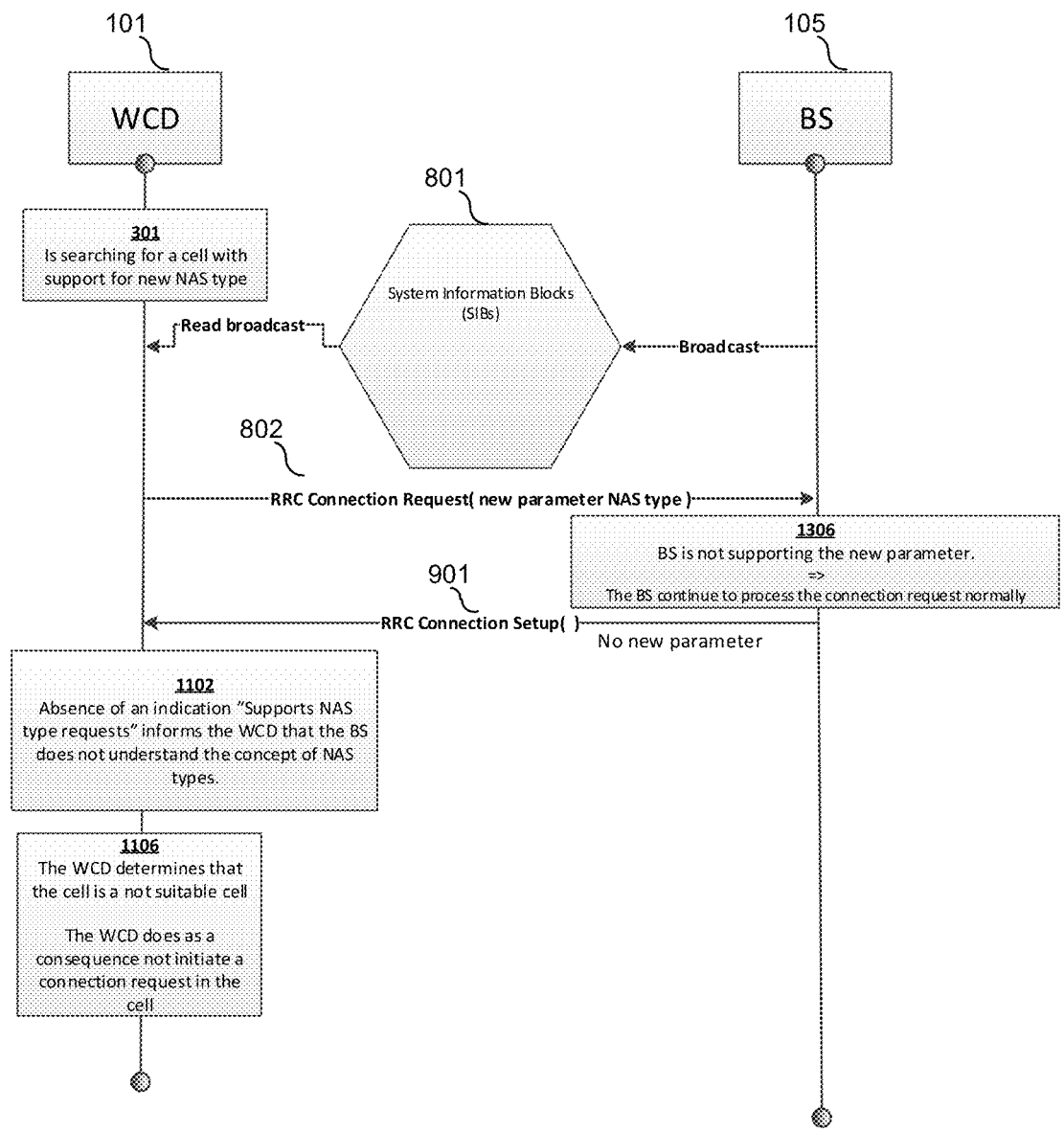
Figure 10:
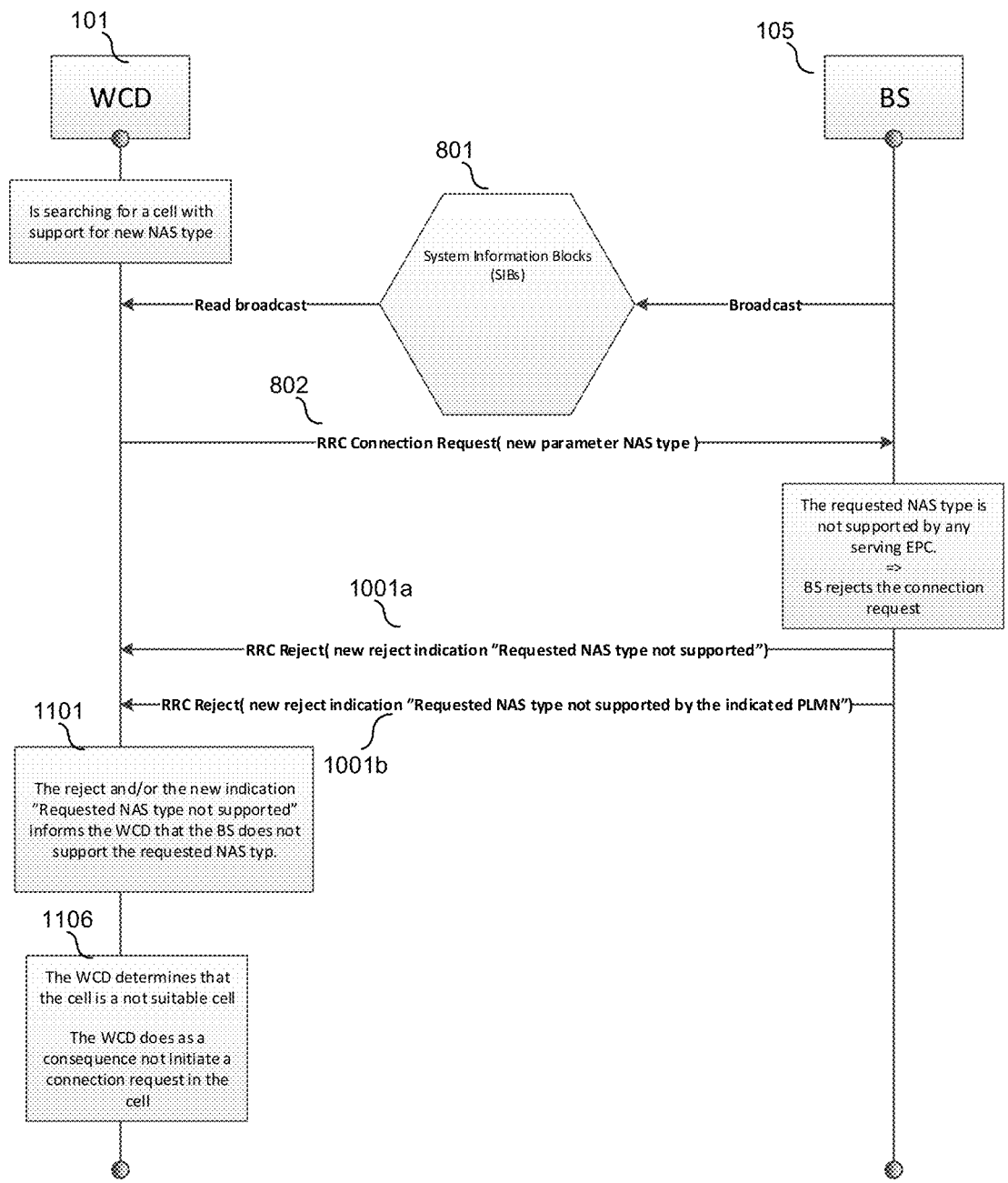

In step 702, the WCD 101 transmits to base station 105 a request message 802 (see FIG. 8), e.g. such as a connection request (e.g. an RRC Connection Request). The request message comprises information identifying a requested NAS type. In some instances, the WCD performs step 702 without having previously received any message from the base station which indicates whether NAS type requests are supported. For example, step 702 may be performed as a result of WCD 101 selecting a cell served by base station 105, wherein the selection of the cell occurs after WCD 101 receives information (e.g., one or more messages 801 comprising one or more SIBs) broadcast or otherwise transmitted by base station 105, wherein the information transmitted by base station 105 does not include information indicating that NAS type requests are supported. This feature is illustrated in FIG. 8, which shows base station 105 broadcasting a message 801 comprising a SIB, which is received by WCD 101.

In step 704, the WCD receives a response message (e.g., message 804, 901, 1001*a* or 1001*b*—see FIGS. 8, 9 and 10 respectively) transmitted by the base station in response to the request message 802. The response message indicates at least whether or not NAS type requests as such are supported by the base station 105. For example, if NAS type requests are supported by the base station (see FIG. 13 steps 1304 and 1308), then the base station will respond to the request message 802 by transmitting response message 804 (e.g. an RRC Connection Setup message, see FIG. 8), which may include information indicating that NAS type requests are supported. In some embodiments, the response message 804 may alternatively or additionally indicate that the requested NAS type identified in the request message 802 is supported by the base station 105. Preferably, this means or indicates that the NAS type is also supported by the CN 104 served by the base station 105. On the other hand, if NAS type requests are not supported by the base station, the base station may transmit a response message 901 (e.g. a RRC Connection Setup message, see FIG. 9), which does not include any information indicating that NAS type requests are supported. For example, a base station which does not understand and ignores a received NAS type request, responds without indicating that NAS type requests are supported. In this case, the WCD aborts the connection request (see FIG. 11 steps 1102 and 1106) since the base station is unable to process a NAS type request. As another example, if NAS type requests as such are supported by the base station but the particular requested NAS type is not supported (see FIG. 13 steps 1304 and 1306), then the base station may respond to the request message 802 by transmitting a response message rejecting the request message (e.g. reject message 1001a or reject message 1001b, e.g. a RRC Reject message, see FIG. 10).

Figure 11:
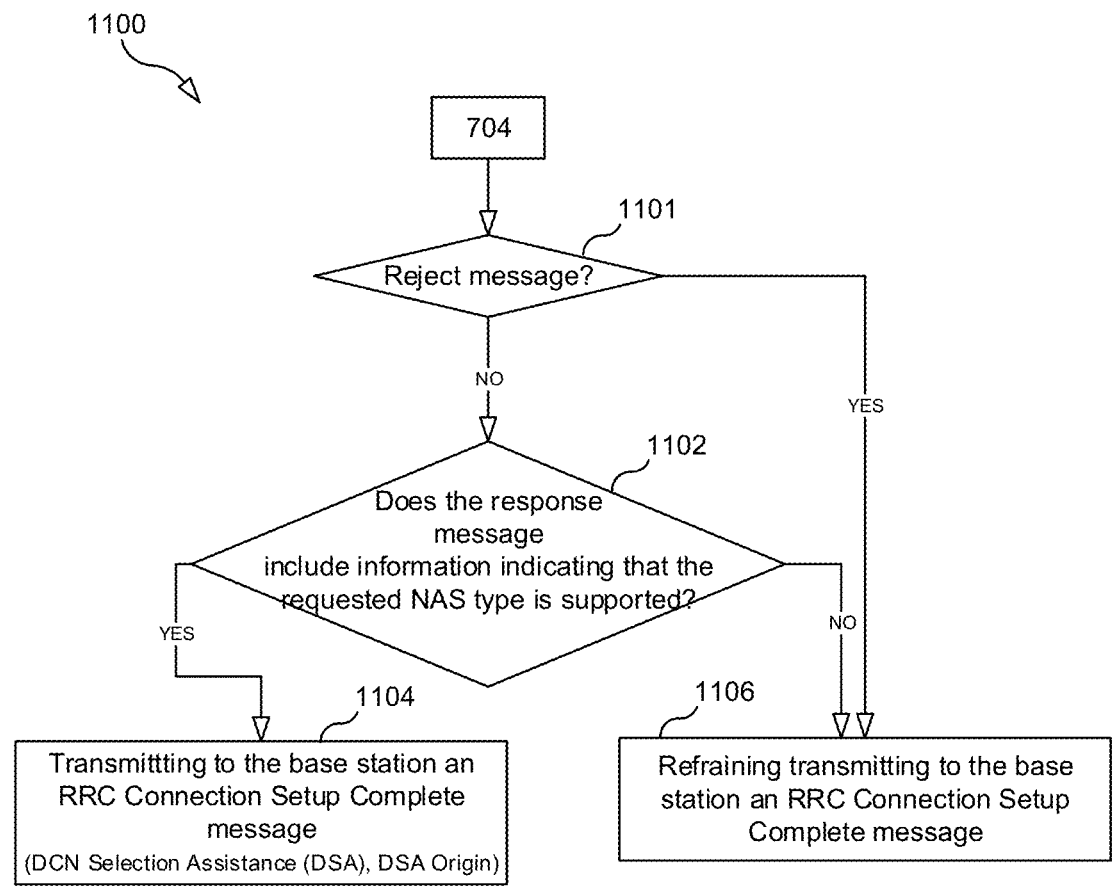
FIGS. 11, 12 and 13 are flow charts illustrating various processes according to some embodiments.

Referring now to FIG. 11, FIG. 11 illustrates an example process 1100 that that WCD 101 may perform in response to receiving the response message in step 704, which response message was transmitted by the base station. As mentioned above and as shown in FIG. 8, the request message 802 transmitted by the WCD in step 702 may be a connection request (e.g., RRC Connection Request message), and the response message received in step 704 may be a connection setup message (e.g., an RRC Connection Setup message 804, 901) or a reject message (e.g., an RRC Connection Reject message 1001a, 1001b). In some embodiments, if NAS type requests are supported, but the particular requested NAS type identified in the request message 802 is not supported, then base station may transmit to the WCD a reject message 1001a or 1001b (e.g., an RRC Connection Reject message) in response to the request message 802. The reject message may comprise information indicating that the requested NAS type identified in the request message is not supported (see e.g., reject message 1001a shown in FIG. 10). In an embodiment, the request message includes information identifying a PLMN, and the RRC Connection Reject message comprises information indicating that the requested NAS type identified in the request message is not supported by the identifying PLMN (see e.g., reject message 1001b shown in FIG. 10).

In step 1101, the WCD determines whether the base station transmitted a response message in the form of a reject message (e.g. 1001a or 1001b). If so, the process proceeds to step 1106, otherwise it proceeds to step 1102.

In step 1102, the WCD determines whether the response message (e.g. message 804 or 901, e.g. an RRC Connection Setup message) includes information indicating that the requested NAS type is supported. If the response message includes information indicating that the requested NAS type is supported, then the process proceeds to step 1104, otherwise the process proceeds to step 1106.

In step 1104, as a result of determining that the response message (e.g. message 804) includes information indicating that the requested NAS type is supported, the WCD may transmit to the base station another message, e.g. a complete message 806 (e.g. an RRC Connection Setup Complete message) in response to the response message.

Here, it is preferred that the WCD 101 provides in the response message (e.g. message 806) both a DSA indication indicating a selected DCN to the base station 105 and a DSA Origin indication indicating the origin of the DSA indication. The discussion above of the DSA indication and the DSA Origin indication made with reference to FIG. 6 step 612 and message 308 applies mutatis mutandis to this step 1104 and to message 806.

In step 1106, as a result of determining that the response message (e.g. message 901 or message 1001a or 1001b) does not include information indicating that NAS type requests are supported, or determining that a reject was transmitted and/or that the requested NAS type is not supported, the WCD refrains from transmitting to the base station a complete message 806 (e.g. an RRC Connection Setup Complete message).

Figure 12:
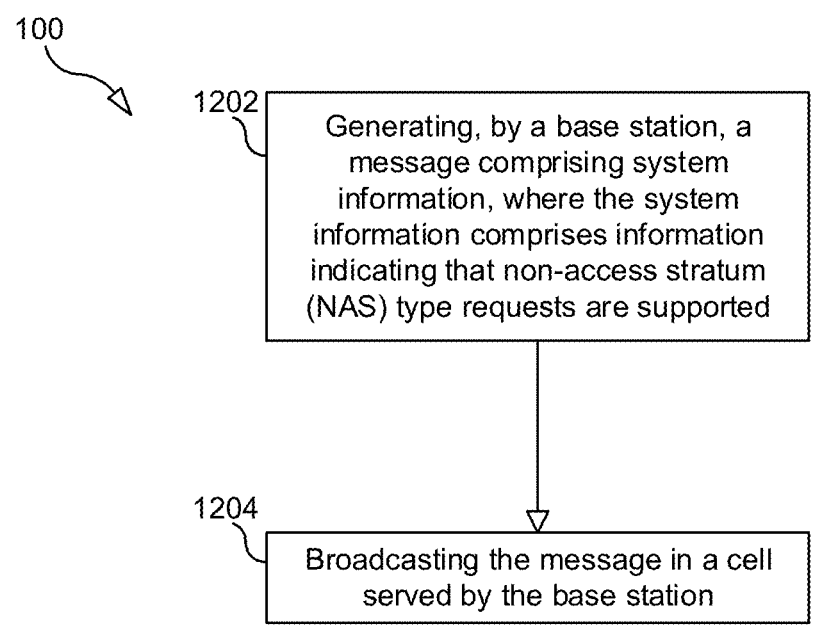

FIG. 12 provides a flow diagram that illustrates an example process 1200 performed by a base station, e.g. base station 105. The process may be used, for example, by the base station to allow WCD 101 to use a particular one of several different types of NAS protocols.

In step 1202, the base station generates a message (e.g. message 302) comprising system information, where the system information comprises information indicating that NAS type requests as such are supported by the base station.

In step 1204, the base station transmits the message comprising the system information (e.g. transmits a broadcast message 302 or uses dedicated signaling to send the message to one or more specific WCD 101). The system information comprises information indicating that NAS type requests as such are supported.

Figure 13:
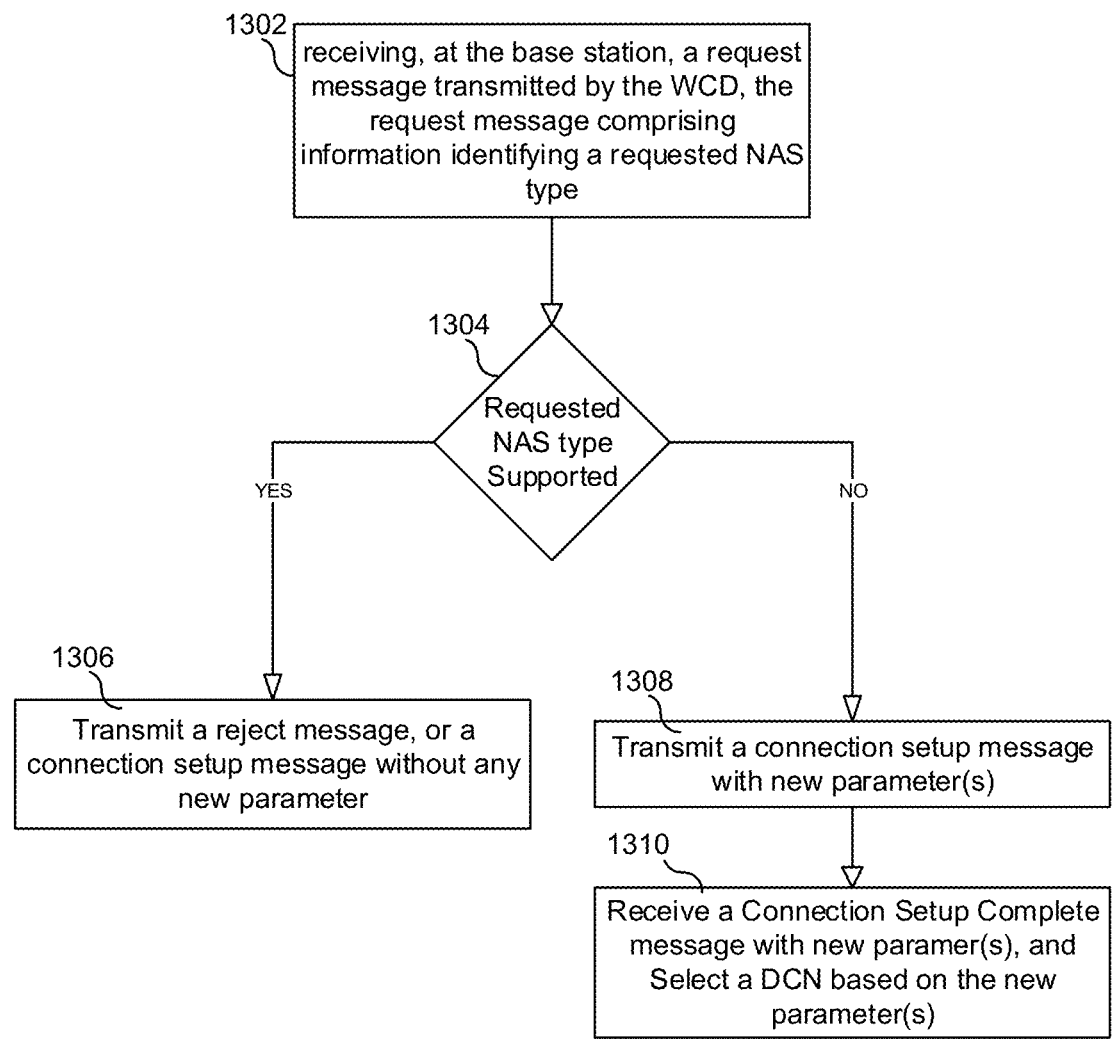

FIG. 13 illustrates additional steps that the base station 105 may perform according to embodiments of the present disclosure. In some instances, the base station performs these steps without having previously broadcasted (or transmitted to the WCD) any message that comprises system information that indicates that NAS type requests are supported. For example, the steps described above with reference to FIG. 12 must not necessarily be performed in all embodiments of the present disclosure.

In step 1302, the base station receives a request message transmitted by WCD 101 (e.g., request message 304 or 802), where the request message comprises information identifying a requested NAS type. In response to the request message, the base station transmits to the WCD a response message (e.g. response message 306 or 802), where the content of the response message depends—as described in steps 1304, 1306, 1308 below—on whether the requested NAS type identified in the request message is supported by the base station.

In step 1304, the base station, in response to receiving the request message in step 1302, determines whether the identified requested NAS type, identified in the received request message, is supported by the base station 105. If the requested NAS type is supported, the process proceeds to step 1308, otherwise the process proceeds to step 1306.

In step 1306, as a result of determining that the requested NAS type is not supported, the base station transmits to the WCD a response message (e.g. message 501a or 501b in FIG. 5, or message 1001a or 1001b in FIG. 10) indicating that the connection request is rejected. Additionally or alternatively, the response message may comprise information indicating that the requested NAS type indicated in the request message sent by the WCD in step 704 is not supported by the base station. Alternatively, if the base station does not support NAS type requests as such (e.g. it may be a legacy base station or similar that does not understand NAS type requests), then the base station may continue to process the request message from the WCD in the normal manner (e.g. according to legacy procedures). This may e.g. be done in that the base station sends a response message (e.g. message 901, e.g. a RRC Connection Setup message, see FIG. 9) without any new parameters.

In step 1308, as a result of determining in step 1304 that the requested NAS type is supported, the base station transmits to the WCD a response message (e.g. message 306 or 804, e.g., an RRC Connection Setup message), which message may indicate that NAS type requests as such are supported by the base station 105. Already this indication, combined with the requested NAS type transmitted by the WCD to the base station in step 1302, may inform the WCD that the requested NAS type is supported. Alternatively or additionally, the response message may indicate that the specific requested NAS type is supported by the base station 105. Preferably, the indication in the response message that NAS type requests is supported and/or the indication that the specific requested NAS type is supported means or indicates to the WCD that the requested NAS type is also supported by the CN 104 served by the base station 105.

In step 1310, as a result of transmitting to the WCD the base station receives a response message (e.g. message 308 or 806, e.g. a complete message, e.g. an RRC Connection Setup Complete message) transmitted by the WCD, which message comprises both a DSA indication indicating a selected DCN and a DSA Origin indication indicating the origin of the DSA indication. The discussion above of the DSA indication and the DSA Origin indication made with reference to FIG. 6 step 612 and message 308 applies mutatis mutandis to this step 1310 and to the received response message.

As mentioned in the discussion of FIG. 6 above, the DSA indication and particularly the additional DSA Origin indication enables the base station to make a better DCN selection, especially when DCN values are not standardized.

Some examples:
The base station may select separate common DCNs for home subscribers and roamers,
The base station may, based on roaming agreement, be able to interpret a foreign DCN value (a DCN value assigned by a different operator) also when there is an overlap in value space between the DCN values,
The base station may select separate DCNs based on individual roaming agreements per PLMN.
As a consequence the risk of that the base station selects an inappropriate DCN and from that would require redirection is if not eliminated so at least substantially reduced.

Figure 14:
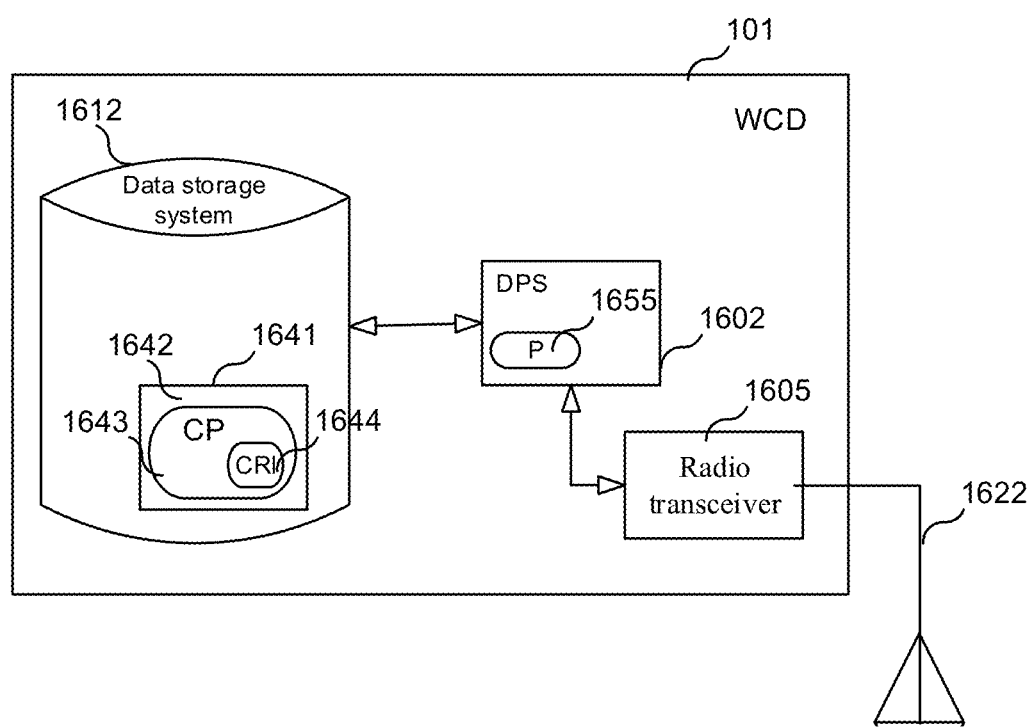
FIG. 14 is a block diagram of a WCD according to some embodiments.

FIG. 14 is a block diagram of an embodiment of WCD 101. As shown in FIG. 16, WCD 101 may include: a data processing system (DPS) 1602, which may include one or more processors 1655 (e.g., a general purpose microprocessor and/or one or more other data processing circuits, such as an application specific integrated circuit (ASIC), field-programmable gate arrays (FPGAs), and the like); a radio transceiver 1605 coupled to an antenna 1622 for use wirelessly transmitting data; and a data storage system 1612, which may include one or more non-volatile storage devices and/or one or more volatile storage devices (e.g., random access memory (RAM)) for storing data. In embodiments where WCD 101 includes a general purpose microprocessor, a computer program product (CPP) 1641 may be provided. CPP 1641 includes a computer readable medium (CRM) 1642 storing a computer program (CP) 1643 comprising computer readable instructions (CRI) 1644. CRM 1642 may be a non-transitory computer readable medium, such as, but not limited, to magnetic media (e.g., a hard disk), optical media (e.g., a DVD), memory devices (e.g., random access memory), and the like. In some embodiments, the CRI 1644 of computer program 1643 is configured such that when executed by data processing system 1602, the CRI causes the WCD 101 to perform steps described above (e.g., steps described above with reference to the flow charts). In other embodiments, WCD 101 may be configured to perform steps described herein without the need for code. That is, for example, data processing system 1602 may consist merely of one or more ASICs. Hence, the features of the embodiments described herein may be implemented in hardware and/or software.

Figure 15:
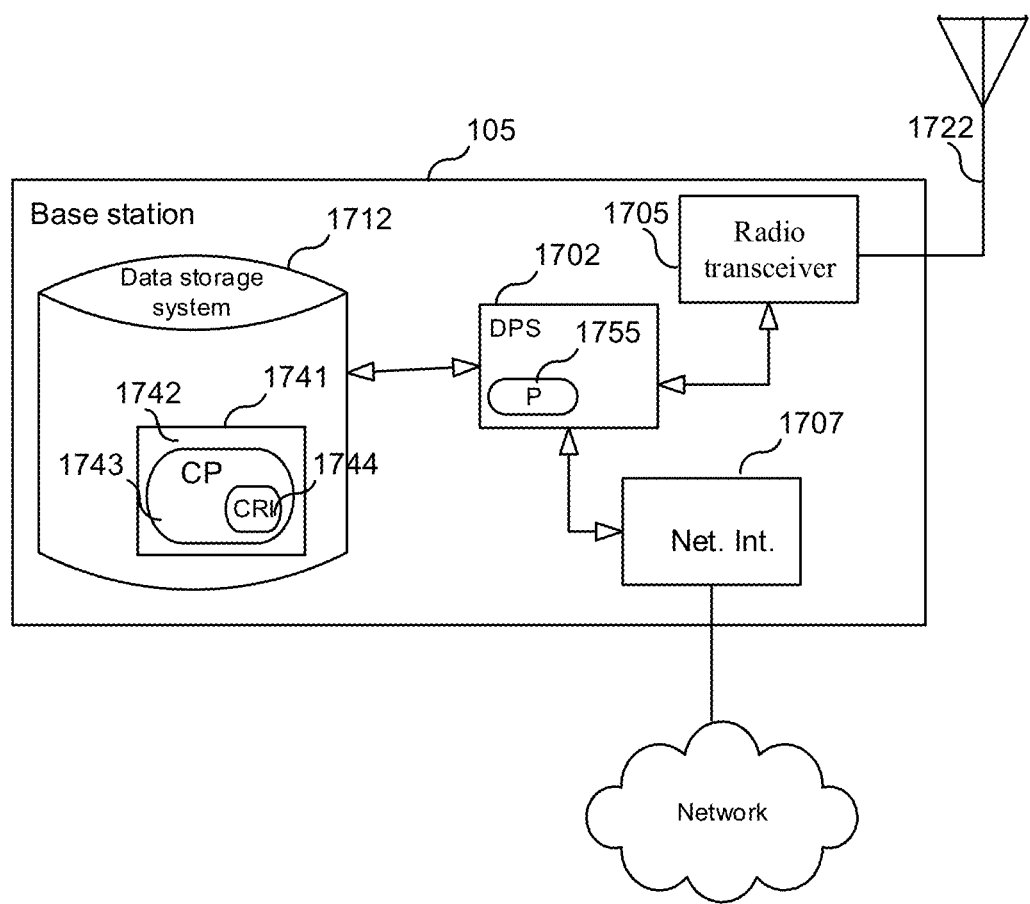
FIG. 15 is a block diagram of a base station according to some embodiments.

FIG. 15 is a block diagram of an embodiment of base station 105. As shown in FIG. 17, base station 105 may include: a data processing system (DPS) 1702, which may include one or more processors 1755 (e.g., a general purpose microprocessor and/or one or more other data processing circuits, such as an application specific integrated circuit (ASIC), field-programmable gate arrays (FPGAs), and the like); a radio transceiver 1705 coupled to an antenna 1722 for use wirelessly transmitting data; a network interface 1007 for connecting the base station to a network; and a data storage system 1712, which may include one or more non-volatile storage devices and/or one or more volatile storage devices (e.g., random access memory (RAM)). In embodiments where base station 105 includes a general purpose microprocessor, a computer program product (CPP) 1741 may be provided. CPP 1741 includes a computer readable medium (CRM) 1742 storing a computer program (CP) 1743 comprising computer readable instructions (CRI) 1744. CRM 1742 may be a non-transitory computer readable medium, such as, but not limited, to magnetic media (e.g., a hard disk), optical media (e.g., a DVD), memory devices (e.g., random access memory), and the like. In some embodiments, the CRI 1744 of computer program 1743 is configured such that when executed by data processing system 1702, the CRI causes the base station 105 to perform steps described above (e.g., steps described above with reference to the flow charts). In other embodiments, base station 105 may be configured to perform steps described herein without the need for code. That is, for example, data processing system 1702 may consist merely of one or more ASICs. Hence, the features of the embodiments described herein may be implemented in hardware and/or software.

Some embodiments described above may be summarized in the following manner:

One embodiment is directed to a method performed by a WCD (101), the method comprising: receiving (201), at the WCD (101), a base station message (302) transmitted by a base station (105); and determining (203), by the WCD, whether the received base station message includes information indicating that Non Access Stratum, NAS, type requests are supported by the base station.

The method may further comprise: transmitting (602) to the base station (105), as a result of determining that the received base station message (302) includes information indicating that NAS type requests are supported, a request message (304) comprising information identifying a requested NAS type.

The method may further comprise: receiving (606), as a result of transmitting the request message (304), a reject message (501*a*, 501*b*) transmitted by the base station, the reject message comprising information indicating that the requested NAS type identified in the request message is not supported.

The method may further comprise: receiving (606), as a result of transmitting the request message (304), a response message (306) transmitted by the base station (105), the response message comprising information indicating that the requested NAS type identified in the request message (304) is supported by the base station.

The method may further comprise: determining (608) whether the received response message (306) includes information indicating that the requested NAS type identified in the request message (304) is supported by the base station (105).

The method may further comprise that the WCD (101) comprises at least one DSA indication indicating a DCN, and a DSA origin indication indicating the origin of the DSA indication, where the method may further comprise: transmitting (612) to the base station (105), as a result of determining that the requested NAS type is supported, a connection message (308) comprising the DSA indication indicating to the base station (105) the DCN selected by the WCD (101) and comprising the DSA origin indication indicating the origin of the DSA indication.

Some other embodiments described above may be summarized in the following manner:

One other embodiment is directed to a method performed by a base station (105) communicating with a wireless communication device, WCD, (101) residing in a cell (106) served by the base station (105), the method comprising: generating (1202), by the base station, a message comprising system information; and transmitting (1204), by the base station, the message comprising the system information, wherein the system information comprises information indicating that Non Access Stratum, NAS, type requests are supported by the base station (105).

The method may further comprise: receiving (1302), at the base station, a request message (304) transmitted by the WCD, the request message comprising information identifying a requested NAS type; and in response to receiving the request message, the base station determining (1304) whether the identified requested NAS type is supported.

The method may further comprise: transmitting (1306) to the WCD, as a result of determining that the requested NAS type is not supported, a response message (501*a*, 501*b*, 1001*a*, 1001*b*) comprises information indicating that the identified requested NAS type is not supported by the base station.

The method may further comprise: transmitting (1308) to the WCD, as a result of determining that the requested NAS type is supported, a response message (306, 804) comprises information indicating that the identified requested NAS type is supported by the base station.

The method may further comprise: receiving (1310), as a result of transmitting the response message (306, 804), a complete message (308, 806) transmitted by the WCD (101) and comprising a Dedicated Core network, DCN, Selection Assistance, DSA, indication, indicating a DCN selected by the WCD and a DSA Origin indication indicating the origin of the DSA indication.

The method may further comprise: selecting (1312), as a result of receiving the complete message (308, 806), a Dedicated Core Network, DCN, for serving the WCD (101), which selection is based on the DSA indication and the DSA origin indication comprised by the received complete message (308, 806).

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration.

Accordingly, it is contemplated that some steps may be added, some steps may be omitted, the order of the steps may be re-arranged, and some steps may be performed in parallel.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The invention claimed is:

1. A method performed by a wireless communication device, WCD, the method comprising:
   receiving, at the WCD, a base station message transmitted by a base station, the WCD comprising at least one Dedicated Core network, DCN, Selection Assistance, DSA, indication, indicating a DCN and a DSA Origin indication indicating the origin of the DSA indication;
   determining, by the WCD, whether the received base station message includes information indicating that Non Access Stratum, NAS, type requests are supported by the base station;
   transmitting to the base station, as a result of determining that the received base station message includes information indicating that NAS type requests are supported, a request message comprising information identifying a requested NAS type,
   receiving, as a result of transmitting the request message, a response message transmitted by the base station, the response message comprising information indicating that the requested NAS type identified in the request message is supported by the base station; and
   transmitting to the base station, in response to receiving the response message, a complete message comprising the DSA indication indicating to the base station the DCN selected by the WCD and comprising the DSA origin indication indicating the origin of the DSA indication.

2. The method according to claim 1, further comprising:
   determining whether the received response message includes information indicating that the requested NAS type identified in the request message is supported by the base station,
   wherein transmitting the complete message comprises transmitting the complete message in response to determining that the received response message includes the information indicating that the requested NAS type identified in the request message is supported by the base station.

3. The method according to claim 1, wherein the WCD is residing in a cell served by the base station.

4. A method performed by a wireless communication device, WCD, the method comprising:
   transmitting, by the WCD, to a base station a request message comprising information identifying a requested Non Access Stratum, NAS, type, the WCD comprising at least one Dedicated Core network, DCN, Selection Assistance, DSA, indication, indicating a DCN and a DSA Origin indication indicating the origin of the DSA indication;
   receiving, at the WCD, as a result of transmitting the request message, a response message transmitted by the base station, the response message indicating that the requested NAS type is supported by the base station; and transmitting to the base station, in response to receiving the response message, a complete message comprising the DSA indication indicating to the base station the DCN selected by the WCD and comprising the DSA origin indication indicating the origin of the DSA indication.

5. The method of claim 4, further comprising:

determining whether the received response message includes information indicating that the requested NAS type identified in the request message is supported by the base station, wherein transmitting to the base station the completed messages comprises transmitting the completed message in response to determining that the received response message includes information indicating that the requested NAS type identified in the request message is supported by the base station.

6. A method performed by a base station communicating with a wireless communication device, WCD, residing in a cell served by the base station, the method comprising:

generating, by the base station, a message comprising system information;

transmitting, by the base station, the message comprising the system information, wherein the system information comprises information indicating that Non Access Stratum, NAS, type requests are supported by the base station;

receiving, at the base station, a request message transmitted by the WCD, the request message comprising information identifying a requested NAS type;

in response to receiving the request message, the base station determining whether the identified requested NAS type is supported;

transmitting to the WCD, as a result of determining that the requested NAS type is supported, a response message comprising information indicating that the identified requested NAS type is supported by the base station; and receiving, as a result of transmitting the response message, a complete message transmitted by the WCD and comprising a Dedicated Core network, DCN, Selection Assistance, DSA, indication, indicating a DCN selected by the WCD and a DSA Origin indication indicating the origin of the DSA indication.

7. The method according to claim 6, further comprising:

selecting, as a result of receiving the complete message, a Dedicated Core Network, DCN, for serving the WCD, which selection is based on the DSA indication and the DSA origin indication comprised by the received complete message.

8. The method according to claim 6, wherein the WCD is residing in a cell served by the base station.

9. A method performed by a base station communicating with a wireless communication device, WCD, residing in a cell served by the base station, the method comprising:

receiving, at the base station, a request message transmitted by the WCD, the request message comprising information identifying a requested NAS type;

in response to receiving the request message, the base station determining whether the identified requested NAS type is supported;

transmitting to the WCD, as a result of determining that the requested NAS type is supported, a response message comprising information indicating that the identified requested NAS type is supported by the base station; and receiving, as a result of transmitting the response message, a complete message transmitted by the WCD and comprising a Dedicated Core network, DCN, Selection Assistance, DSA, indication, indicating a DCN selected by the WCD and a DSA Origin indication indicating the origin of the DSA indication.

10. The method of claim 9, further comprising:

generating, by the base station, a message comprising system information; and transmitting, by the base station, the message comprising the system information, wherein the system information comprises information indicating that Non Access Stratum, NAS, type requests are supported by the base station.

* * * * *